United States Patent [19]

Okada et al.

[11] Patent Number: 5,202,807
[45] Date of Patent: Apr. 13, 1993

[54] MAGNETIC HEAD DEVICE FOR PROVIDING HIGH RECORDING DENSITIES AT HIGH SPEEDS

[75] Inventors: Hideo Okada, Nara; Hiroaki Takeuchi, Tenri; Tohru Okuda, Nara, all of Japan

[73] Assignee: Sharp Kabushiki Kaisha, Osaka, Japan

[21] Appl. No.: 669,135

[22] Filed: Mar. 13, 1991

Related U.S. Application Data

[63] Continuation-in-part of Ser. No. 591,045, Oct. 1, 1990, abandoned.

[30] Foreign Application Priority Data

Oct. 5, 1989 [JP] Japan ................... 1-260647

[51] Int. Cl.$^5$ ............................................. G11B 5/187
[52] U.S. Cl. ....................................................... 360/122
[58] Field of Search ............... 360/122, 125, 119, 113

[56] References Cited

U.S. PATENT DOCUMENTS

| | | | |
|---|---|---|---|
| 4,839,959 | 6/1989 | Mersing | 360/122 |
| 4,888,657 | 12/1989 | Lacey et al. | 360/122 |

FOREIGN PATENT DOCUMENTS 60-124052 7/1985 Japan .
61-182615 10/1990 Japan .

Primary Examiner—Stuart S. Levy
Assistant Examiner—Craig A. Renner
Attorney, Agent, or Firm—David G. Conlin; Robert F. O'Connell

[57] ABSTRACT

A magnetic head device includes a magnetic head having a sliding surface on which a magnetic tape slides. The sliding surface has a magnetic gap formed on the vertex portion thereof in a manner to allow the magnetic gap itself to record or reproduce information signal on or from the magnetic tape. Defining that $\alpha$ is an angle formed between a tangent drawn at the vertex portion of the sliding surface and a tangent drawn at the end portion of the sliding surface, $\beta$ is an angle formed between the inflow direction of the magnetic tape to the sliding surface and the tangent drawn at the vertex portion of the sliding surface and T is tension applied on the magnetic tape per unit width, the form of the magnetic head and the location and tension of the magnetic tape are arranged so that a parameter value obtained by an equation of $T \times \sin(\beta - \alpha)$ is in the range of 0.02 gf/mm to 0.15 gf/mm.

6 Claims, 6 Drawing Sheets

MAGNETIC HEAD DEVICE FOR PROVIDING HIGH RECORDING DENSITIES AT HIGH SPEEDS

CROSS-REFERENCES TO RELATED APPLICATION

This application is a continuation-in-part application of U.S. Ser. No. 07/591,045 filed on Oct. 1, 1990, now abandoned.

BACKGROUND OF THE INVENTION

1. Field of the Invention

The present invention relates to a magnetic head device for a recording and reproducing apparatus which is designed to travel a magnetic tape in both directions at a high speed for the purpose of keeping storage capacitance larger and a recording density more integrated.

2. Description of the Related Art

A magnetic head device which applicants know, capable of recording and reproducing an information signal on and from a magnetic tape, includes a magnetic head, a convexly curved sliding surface formed on a tip side of the magnetic head, a magnetic gap provided on the substantially central position of the convexly curved sliding surface, and guide rollers for guiding the magnetic tape along the convexly curved sliding surface. The area on which the magnetic tape keeps in contact with the convexly curved sliding surface is variable depending on the positional relation between the guide rollers and the convexly curved sliding surface. And the area with which the magnetic tape comes into contact does not occupy the overall width of the sliding area but only the central width located thereon.

When the magnetic tape is running along the convexly curved sliding surface at a high speed, a fluid lubrication effect brings about a gap (referred to as spacing) between the convexly curved sliding surface and the magnetic tape. The spacing distributed on the left side of the magnetic gap is greatly different from that distributed on the right side thereof. In such spacing distribution, the spacing located on the magnetic gap may be made larger by a disturbance such as vibrations. As the spacing becomes larger, the output loss is made larger. Hence, it is impossible to realize stable short wave recording for improving a recording density by the device which has the foregoing arrangement.

For improving the spacing distribution, a known magnetic head device, as disclosed in the Japanese Patent Application Laying Open (KOKAI) No. 60-124052, is designed to provide an angle $\alpha$ formed between a straight line connecting both ends of a convexly curved sliding surface of a magnetic head, that is, a chord and tangent drawn at the end portion of the convexly curved sliding surface (referred to as a tangent angle) to be smaller than an angle $\beta$ formed between the chord and the inflow direction of a magnetic tape (referred to as a winding angle), and a ratio $\beta/\alpha$ to be in the range of 1.2 to 2.5. The design makes it possible to obtain substantially uniform spacing distribution having no inclination or unevenness on the overall width of the convexly curved sliding surface, resulting in keeping the spacing located on the magnetic gap substantially stable even if a disturbance such as vibrations takes place. Hence, it is possible to obtain a stable electromagnetic conversion characteristic.

Recently, this type of the magnetic tape has been keeping storage capacitance larger and tape transfer faster. As the recording density becomes higher, therefore, focus has been put on a head touch between a magnetic head and a magnetic tape. Smaller spacing has been requested than the foregoing substantially uniform spacing distribution having no inclination and unevenness.

The foregoing arranged device, however, cannot always offer an excellent electromagnetic conversion characteristic when running the magnetic tape at a high speed.

The reason why those related arts cannot meet the fine spacing required by the recent magnetic tape will be explained as follows. For example, according to the relation between a head output and tension (referred to as tape tension) applied on the magnetic tape when a test is done by use of the above magnetic head device in the state of setting the ratio $\beta/\alpha$ to 2.0, as the tape tension increases, the head output becomes larger. Then, when the tape tension reaches a value Ta, the head output is gradually decreased along the increase of the tape tension. That is, the spacing is variable depending on the tape tension, so that the head output varies not only as the ratio $\beta/\alpha$ but also as the tape tension.

And according to the relation between a ratio $\beta/\alpha$ and an output given by the test performed under the condition that the winding angle $\beta$ of the magnetic tape and the tangent angle $\alpha$ of the magnetic head is being changed, the head output becomes maximum when the ratio $\beta/\alpha$ stays in the range of 3 to 4. Here, the magnetic tape speed in reading is 90 IPS. And the results of the other tests indicate their own optimal ratio $\beta/\alpha$ values for the maximum head output.

As is apparent from the above description, if the ratio $\beta/\alpha$ is adjusted to be in the range of 1.2 to 2.5, the resulting spacing does not necessarily meet the requested small spacing. In particular, the lower tape tension results in causing considerably large spacing, thereby lowering the output and being unable to keep a recording density sufficiently higher.

SUMMARY OF THE INVENTION

It is therefore an object of the present invention to provide a magnetic head device which is capable of minimizing spacing between a magnetic head and a magnetic tape as much as possible for improving an electromagnetic conversion characteristic.

In carrying out the invention in a preferred mode, the magnetic head device is provided with a magnetic head having a convexly curved sliding surface on which a flexible magnetic recording medium such as a magnetic tape slides and a magnetic gap is formed to record or reproduce information signal on or from the flexible magnetic recording medium at the substantially vertex of the convexly curved sliding surface, whereby defining that $\alpha$ is an angle formed between a tangent drawn at the vertex portion of the convexly curved sliding surface and a tangent drawn at the end portion of the convexly curved sliding surface, $\beta$ is an angle formed between the inflow direction of the flexible magnetic recording medium into the convexly curved sliding surface and a tangent drawn at the vertex portion of the convexly curved sliding surface, and T is tension applied on the flexible magnetic recording medium per unit width, the form of the magnetic head and the location and tension of the flexible magnetic recording medium being arranged to set a parameter value obtained by an equation of $T \times \sin(\beta - \alpha)$ to be in the range of 0.02 gram force/mm to 0.15 gram force/mm.

By arranging them to set the parameter value to the range, it is possible to minimize spacing between the magnetic head and the magnetic recording medium when running the magnetic recording medium. The parameter value is defined by considering the tension T applied on the magnetic recording medium. Even if the magnetic recording medium is running at a high speed with greater tension applied thereon, the relation of $\alpha$ and $\beta$ can be reversed for compensating for the increment of the tension, thereby minimizing spacing as much as possible when running the magnetic recording medium. It results in being able to keep an electromagnetic conversion characteristic stable for enhancing a recording density when running the magnetic recording medium at a high speed.

Further objects and advantages of the present invention will be apparent from the following description of the preferred embodiment of the invention as illustrated in the accompanying drawings.

DESCRIPTION OF THE PREFERRED EMBODIMENT

An embodiment of the present invention will be described with reference to FIG. 1 to FIG. 4.

Figure 1:
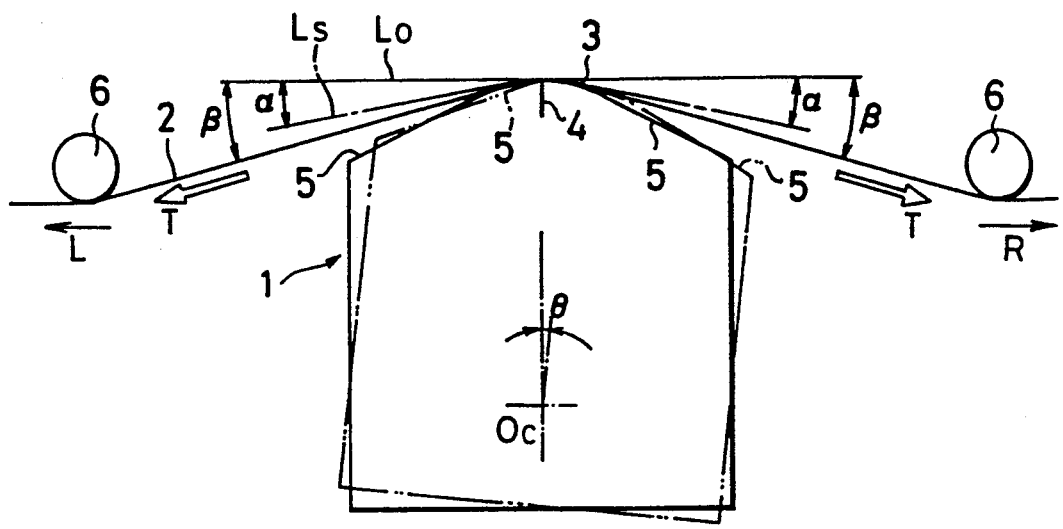
FIG. 1 is a lateral view schematically showing a magnetic head and a magnetic tape running therearound according to an embodiment of the invention.

FIG. 1 is a lateral view schematically showing a magnetic head and a magnetic tape running therearound according to an embodiment of the invention.

Figure 2:
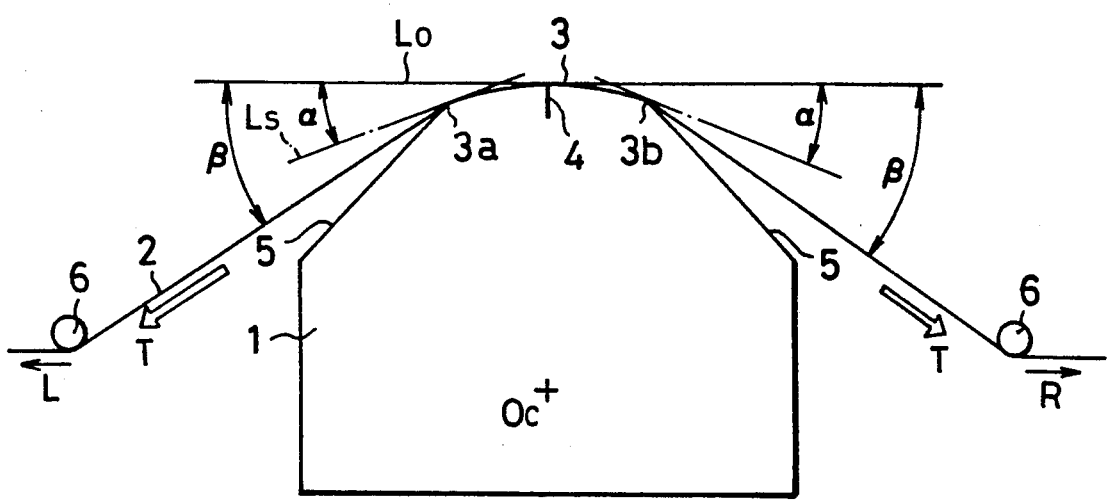
FIG. 2 is an longitudinal view schematically showing in detail a magnetic head and a magnetic tape running therearound of FIG. 1.

FIG. 2 is an longitudinal view schematically showing in detail a magnetic head and a magnetic tape running therearound of FIG. 1.

As shown in FIG. 1 and FIG. 2, 1 denotes a magnetic head and 2 denotes a magnetic tape. The magnetic head 1 has a convexly curved portion serving as a sliding surface 3. On the center of the sliding surface 3 is formed a magnetic gap 4 for recording and reproducing an information signal on and from the magnetic tape 2. Both end sides of the sliding surface 3 are formed as inclined surfaces 5, which do not come into contact with the magnetic tape 2. The inclined surfaces 5 are smoothly connected to the sliding surface 3 from its both sides.

Figure 3:
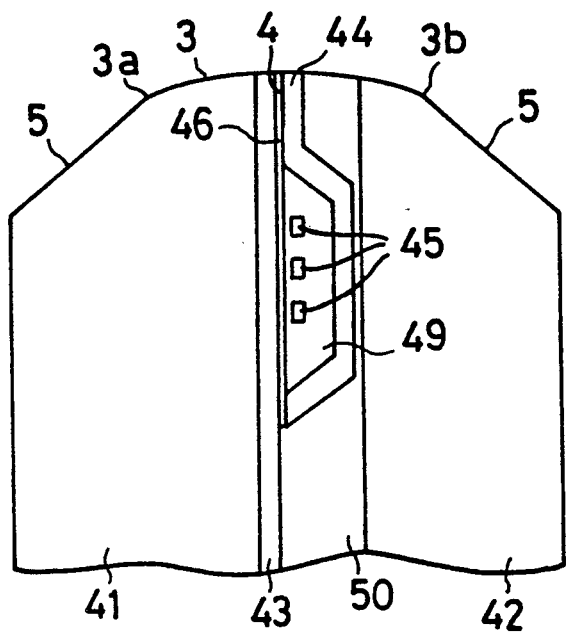
FIG. 3 is a cutaway longitudinal-sectional view schematically showing the magnetic head shown in FIG. 2.

FIG. 3 is a cutaway longitudinal-sectional view schematically showing the magnetic head 1 shown in FIG. 2.

In FIG. 3, the same reference numbers are attached concerning the same constructions as shown in FIGS. 1 and 2.

41 denotes a base board of the magnetic head 1. The base board 41 supports the magnetic head 1 and is made of altic ($Al_2O_3$-TiC). 43 denotes a lower magnetic layer which is formed on the base board 41. The lower magnetic layer 43 includes a soft magnetic metal film having a high-saturated magnetic flux density. An upper magnetic layer 44 is formed upside the lower magnetic layer 43. The upper magnetic layer 44 includes the soft magnetic metal film having a high-saturated magnetic flux density the same as the lower magnetic layer 43. A non-magnetic insulating film 46 consisting of a thin film of a non-magnetic body is formed between the upper magnetic layer 44 and the lower magnetic layer 43. The magnetic gap 4 is formed by the non-magnetic insulating film 46. 42 denotes a protecting board which is made of altic ($Al_2O_3$-TiC) the same as the base board 41. The protecting board 42 is adhered to the upper magnetic layer 44 through a resin layer 50. 45 denotes a conductive layer which is insulated from other layers by an insulating layer 49. According to the above construction, the sliding surface 3 is formed by the altic ($Al_2O_3$-TiC) which has an excellent abrasion resistance. Therefore, the deterioration of the sliding surface 3 effected by the sliding of the magnetic tape 2 is restricted to be exceedingly low, so the initial shape of the magnetic head 1 is maintained for a long time.

The magnetic tape 2 is driven by a driving mechanism (not shown) so that it runs toward the arrow L or R at a high speed. At the magnetic gap 4, the information signal is recorded on or reproduced from the magnetic tape 2. The tape tension applied on the magnetic tape 2 is allowed to be controlled by the driving mechanism. The magnetic tape 2 is guided by the tape guide rollers 6 which are provided on both sides of the magnetic head 1, respectively, so that it is wound around the overall width of the sliding surface 3 of the magnetic head 1.

In FIGS. 1 and 2, $\alpha$ is an angle formed between a tangent Ls drawn at the end (3a or 3b in FIG. 2) of the sliding surface 3 of the magnetic head 1 and a tangent $L_0$ drawn at the center of the sliding surface 3, that is, the vertex of the sliding surface 3 at which the magnetic gap 4 is formed. The angle $\alpha$ is referred to as a tangent angle. $\beta$ is an angle formed between the inflow or outflow direction of the magnetic tape 2 into or from the sliding surface 3 and the tangent drawn at the vertex of the sliding surface 3. The angle $\beta$ is referred to as a winding angle. T denotes the tape tension of the magnetic tape 2 per unit width.

Figure 4:
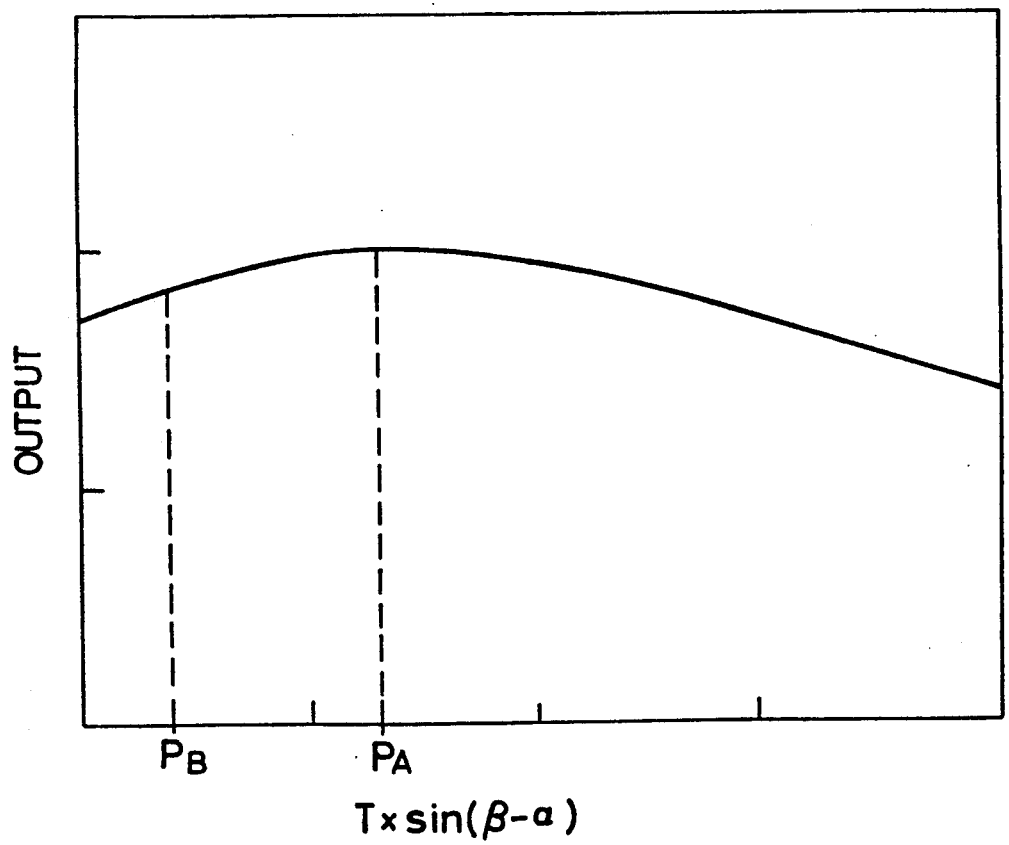
FIG. 4 is a graph illustrating the relation between an output and a parameter of $T \times \sin(\beta - \alpha)$ measured in the embodiment.

FIG. 4 is a graph showing the relation between a parameter value P and an output, in which the parameter value can be obtained by the equation of $P = T \times \sin(\beta - \alpha)$ and the output is measured as the tangent angle $\alpha$, the winding angle $\beta$ and the tape tension T change to various values. As is apparent from the graph, the output becomes maximum when the parameter value reaches $P_A$. The output becomes smaller when it is made higher or lower than $P_A$. The spacing measured when the parameter value reaches $P_A$, that is, the output becomes maximum is in the order of several tens of nanometers. The spacing value substantially matches to the surface coarseness of the magnetic tape 2. Hence, it turns out to be the minimum spacing from a practical point of view.

Figure 5:
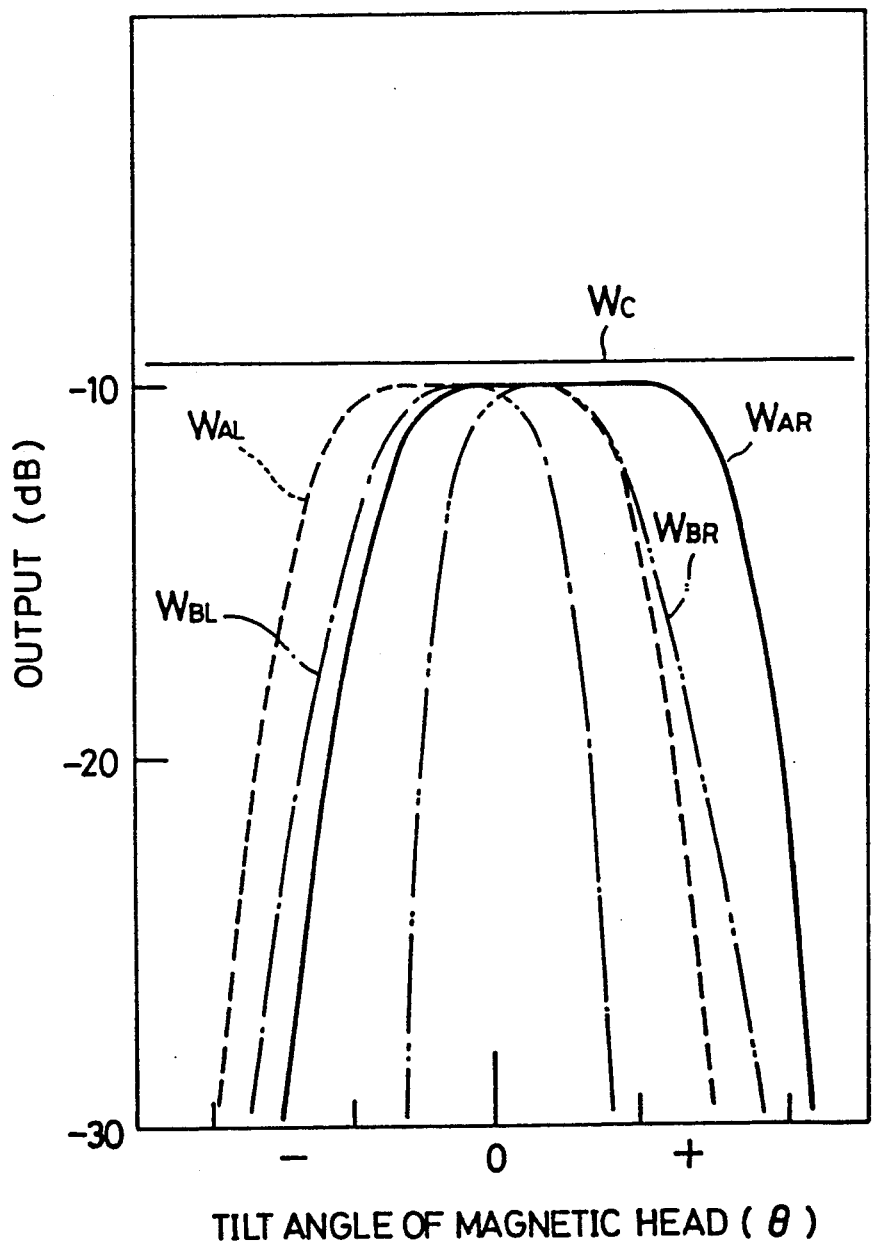
FIG. 5 is a graph illustrating the relation between an output and a tilt angle of the magnetic head measured in the embodiment.

FIG. 5 is a graph showing the relation between a tilt angle and an output, in which the tilt angle $\theta$ means how the magnetic head 1 is tilted on the basis of a curvature center Oc of the sliding surface 3 as shown by a two-dot chain line of FIG. 1 and the output is measured on the condition that the maximum output is provided and the magnetic tape 2 runs at a low speed (5 IPS) or a high speed (90 IPS). Further, + side means that the magnetic head 1 is tilted toward the R side as shown by the two-dot chain line of FIG. 1.

In FIG. 5, the line denoted by $W_c$ is an output level given when the magnetic tape 2 runs at a low speed, assuming that the tilt angle $\theta$ of the magnetic head 1 is zero. The line denoted by $W_{AR}$ is the output given when the magnetic tape 2 runs toward the R side of FIG. 1 at a high speed. The line denoted by $W_{AL}$ is the output given when the magnetic tape 2 runs toward the L side of FIG. 1 at a high speed. The magnetic head 1 used in this measurement is a magneto-resistance effect type head (MR head). And, the magnetic tape 2 used therein contains an information signal recorded with a predetermined recording wavelength. The recording wavelength is adjusted so that it brings about no core loss when the magnetic tape 2 runs at a high speed. It means that the output loss caused when the magnetic tape 2 runs at a high speed or a low speed is substatially considered as spacing loss.

When the tilt angle $\theta$ is zero, the output given when the magnetic tape 2 runs at a high speed is made a bit lower than given when it runs at a low speed. Between the magnetic head 1 and the magnetic tape 2, thus, it is possible to substantially keep the minimum spacing. In addition, when the running direction is switched to the opposite direction, it is also possible to keep the same output level.

As is apparent from FIG. 5, when the magnetic head 1 is mounted to be tilted, it is possible to keep the substantially same output level as long as the tilt angle is the an allowable range.

As mentioned above, when the parameter value P reaches a proper value, that is, a value close to the parameter value $P_A$ allowing the provision of the maximum output as shown in FIG. 4, it is possible to keep the output substantially the same when the magnetic tape 2 runs at both, low and high, speeds or when the running direction is switched to the opposite direction. Further, even when the magnetic head 1 is tilted to a certain extent, it is also possible to keep the maximum output. It means that some margin is provided in the mounting position of the magnetic head 1. Hence, it is very easy to mount the magnetic head 1 and adjust it.

In FIG. 4, $P_B$ denotes a parameter value at which the output becomes lower than the maximum output. The output curves measured at the parameter value $P_B$ and the high-speed running mode are denoted by $W_{BR}$ and $W_{BL}$ shown in FIG. 5. $W_{BR}$ denotes the magnetic tape 2 running at a high speed toward the R side shown in FIG. 1. $W_{BL}$ denotes the magnetic tape 2 running at a high speed toward the L side shown in FIG. 1. Even under this condition, it is possible to obtain the substantially same output as that measured at a low speed mode. It means that the minimum spacing is realized. However, margin is hardly provided about the tilt of the magnetic head 1, so that it is quite difficult to adjust the position of the magnetic head 1.

Figure 6:
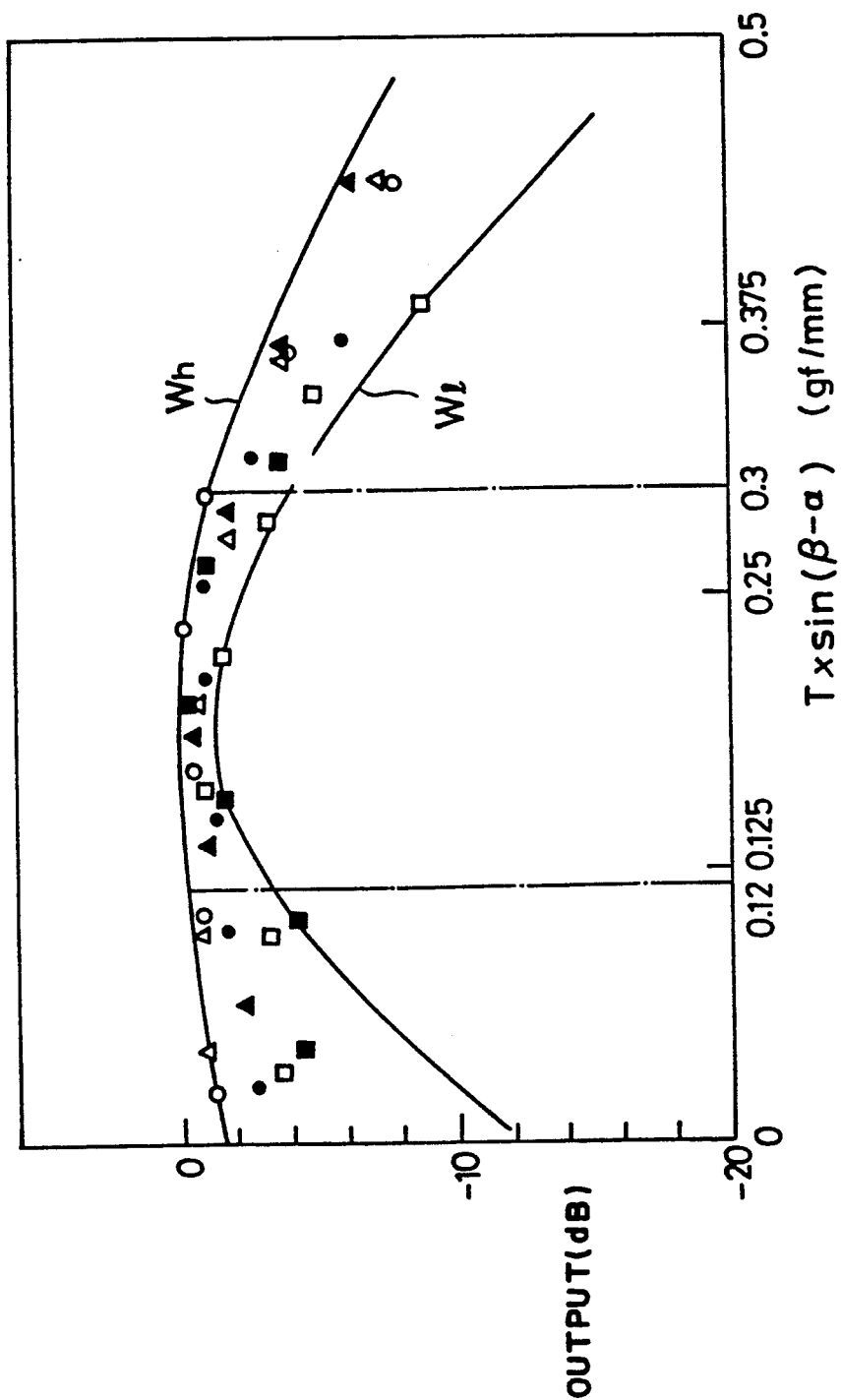
FIG. 6 is a graph illustrating the relation between an output and parameters of $T \times \sin(\beta - \alpha)$ for several commercially available magnetic tapes measured in the embodiment.

FIG. 6 is a graph showing the relation between the parameter given by the equation of $T \times \sin(\beta - \alpha)$ and the output, in which the output is measured by using the commercially available magnetic tape and changing the form of the magnetic head being formed by a ferrite, the winding angle of the magnetic tape and the tape tension for the purpose of obtaining a proper value of the parameter value P. In FIG. 6, Wh denotes an upper line of an output, Wl denotes a lower line. It is to be understood from the graph that by setting the parameter value P to be in the range of 0.12 gram force/mm to 0.3 gram force/mm extending over both sides of the output peak value, the output is not made so much lower at the lower line Wl and the minimum spacing is substantially kept when the magnetic tape 2 is running.

As described above, by arranging the parameter value $T \times \sin(\beta - \alpha)$ to be in the range of 0.12 gram force/mm to 0.3 gram force/mm, it is possible to reduce the spacing between the magnetic head 1 and the mangetic tape 2 to a minimum when the magnetic tape 2 runs at a high speed. It results in reducing the spacing loss, so that the electromagnetic conversion characteristic can be enhanced to such a value as keep a recording density higher.

Figure 7:
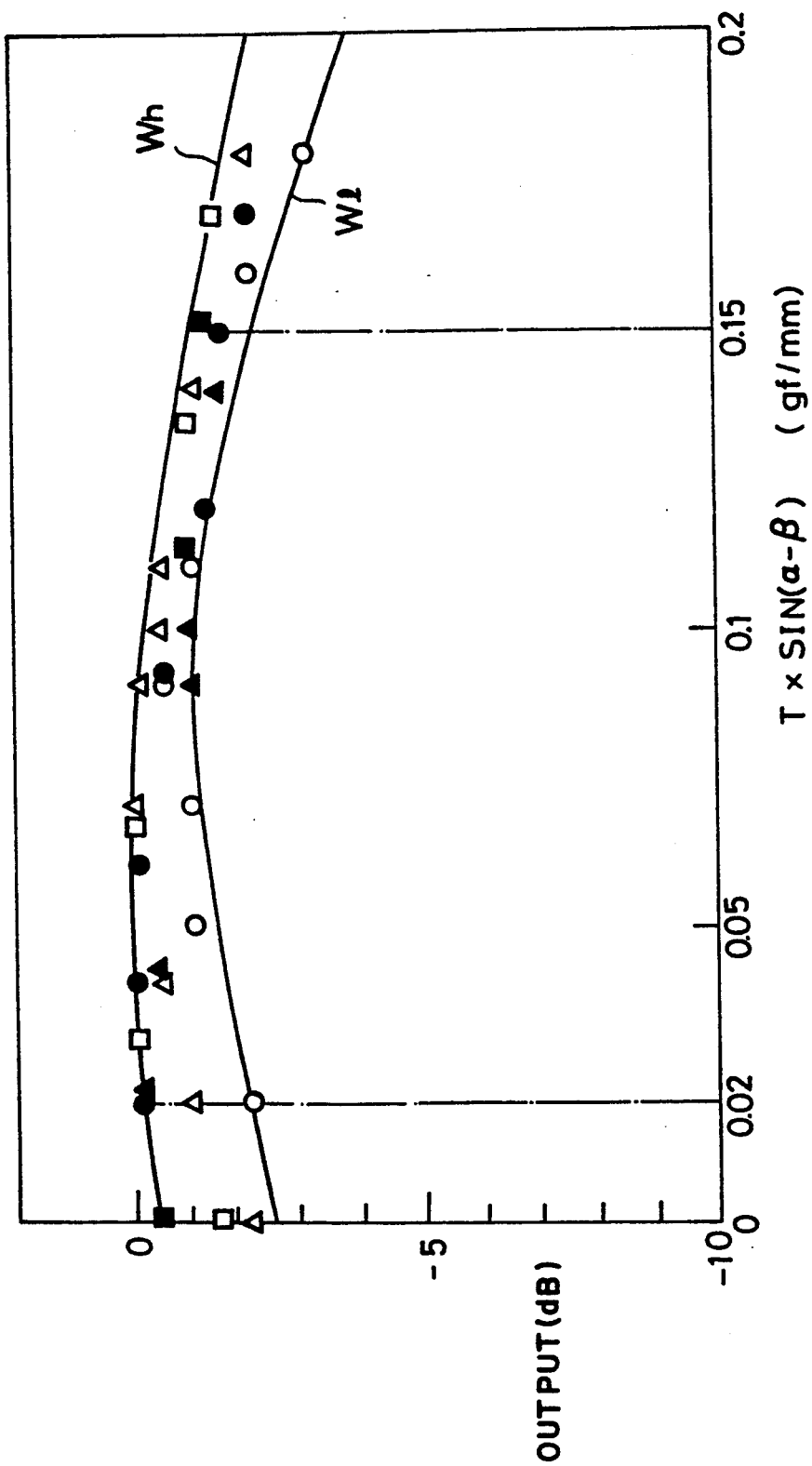
FIG. 7 is an another graph illustrating the relation between an output and parameters of $T \times \sin(\beta - \alpha)$ for several commercially available magnetic tapes measured in the embodiment.

FIG. 7 is an another graph showing the relation between the parameter given by the equation of $T \times \sin(\beta - \alpha)$ and the output, in which the output is measured by using the commercially available magnetic tape and changing the form of the magnetic head being formed by altic ($Al_2O_3$-TiC), the winding angle of the magnetic tape and the tape tension for the purpose of obtaining a proper value of the parameter value P. In FIG. 7, Wh and Wl denote the same meaning as shown in FIG. 6. It is to be understood from the graph that by setting the parameter value P to be in the range of 0.02 gram force/mm to 0.15 gram force/mm extending over both sides of the output peak value, the output is not made so much lower at the lower line Wl and the minimum spacing is substantially kept when the magnetic tape 2 is running.

As described above, by arranging the parameter value $T \times \sin(\beta - \alpha)$ to be in the range of 0.02 gram force/mm to 0.15 gram force/mm, it is possible to reduce the spacing between the magnetic head 1 and the mangetic tape 2 to a minimum when the magnetic tape 2 runs at a high speed. It results in reducing the spacing loss, so that the electromagnetic conversion characteristic can be enhanced to such a value as keep a recording density higher.

And the foregoing embodiment makes it possible to offer the minimum spacing in both of the running directions of the magnetic tape and a stable electromagnetic conversion characteristic.

As described above, the foregoing embodiment provides margin about the tilt of the magnetic head 1. It results in offering the effect that it is easy to mount the magnetic head 1 and adjust it.

The foregoing embodiment has employed one magnetic head 1, however, it may employ a plurality of magnetic heads such as combined heads even if each magnetic head meets a proper condition about the parameter. The latter example can also offer the same effect as the foregoing embodiments.

Figure 8:
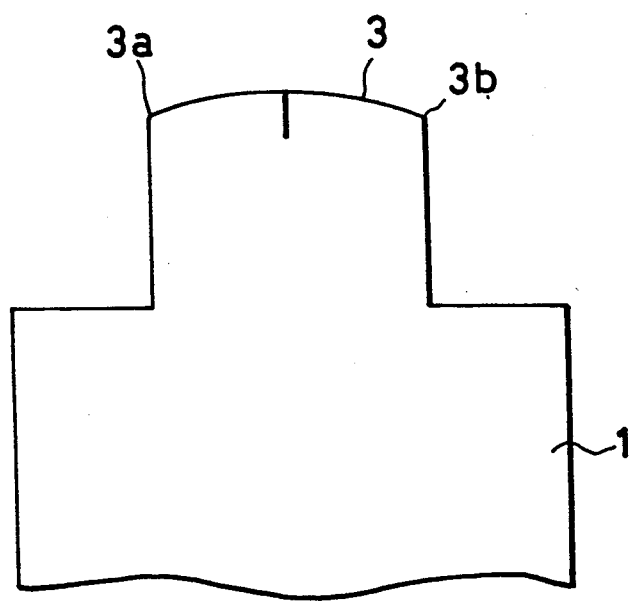
FIG. 8 is a cutaway longitudinal-sectional view schematically showing a magnetic head of FIG. 2.

FIG. 8 is a cutaway longitudinal-sectional view schematically showing the magnetic head.

The foregoing embodiment has employed the magnetic head 1 having inclined surfaces 5 shown in FIGS. 1 and 2, however, as shown in FIG. 8, the top shape of the magnetic head 1 may employ the shape having a difference in level at the ends 3a and 3b of the sliding surface 3. This example can also offer the same effect as the foregoing embodiment.

Many widely different embodiments of the present invention may be constructed without departing from the spirit and scope of the present invention. It should be understood that the present invention is not limited to the specific embodiment described in the specification, except as defined in the appended claims.

What is claimed is:

1. A magnetic head device comprising a magnetic head having a convexly curved sliding surface on which a flexible magnetic recording medium slides, said convexly curved sliding surface having a magnetic gap formed on a substantially vertex portion thereof and serving to record or reproduce an information signal on or from said flexible magnetic recording medium, a form of said magnetic head and a location and tension of said flexible magnetic recording medium being arranged to assume a parameter value obtained at at least one end of said convexly curved sliding surface by an equation of $T \times \sin(\beta - \alpha)$ to be in a range of 0.02 gram-force/mm to 0.15 gram-force/mm, in which $\alpha$ is an angle formed between a tangent drawn at a vertex of said convexly curved sliding surface and a tangent drawn at the end of said convexly curved sliding surface, $\beta$ is an angle formed between an inflow direction of said flexible magnetic recording medium into said convexly curved sliding surface and the tangent drawn at the vertex of said convexly curved sliding surface, and T is tension applied on said flexible magnetic recording medium per unit width.

2. A magnetic head device according to claim 1, wherein said magnetic head is formed by an altic (Al$_2$O$_3$-Tic).

3. A magnetic head device according to claim 1, wherein said flexible magnetic recording medium is a magnetic tape.

4. A magnetic head device according to claim 1, wherein some margin is provided for a mounting position of said magnetic head.

5. A magnetic head device according to claim 1, wherein said magnetic head device consists of more than one magnetic head.

6. A magnetic head device according to claim 5, wherein said magnetic heads are formed by an altic (Al$_2$O$_3$-Tic).

* * * * *